United States Patent [19]

Stewart

[11] 4,353,355
[45] Oct. 12, 1982

[54] SOLAR ENERGY COLLECTORS

[75] Inventor: John M. Stewart, River Drive Park, Canada

[73] Assignee: Sunglo Solar Ltd., Downsview, Canada

[21] Appl. No.: 93,478

[22] Filed: Nov. 13, 1979

[51] Int. Cl.³ .................. F24J 3/02; B29C 19/02; B23K 13/02
[52] U.S. Cl. .................. 126/445; 126/448; 156/272.4; 165/174; 219/10.53
[58] Field of Search ............. 126/445, 417, 448, 444, 126/449; 219/10.53; 156/273, 272; 165/174

[56] References Cited

U.S. PATENT DOCUMENTS

| 3,730,804 | 5/1973 | Dickey | 156/273 X |
| 3,934,323 | 1/1976 | Ford et al. | 126/448 X |
| 4,024,853 | 5/1977 | Gordon | 126/448 |
| 4,035,547 | 7/1977 | Heller, Jr. et al. | 219/10.53 X |
| 4,114,597 | 9/1978 | Erb | 126/448 |
| 4,120,712 | 10/1978 | Sindt | 219/10.53 X |
| 4,131,110 | 12/1978 | Jones, Jr. | 126/426 |
| 4,213,450 | 7/1980 | Perez | 126/450 X |
| 4,217,887 | 8/1980 | Hoffman et al. | 126/448 |

FOREIGN PATENT DOCUMENTS

2535581 2/1976 Fed. Rep. of Germany ...... 126/448

Primary Examiner—Samuel Scott
Assistant Examiner—Randall L. Green

[57] ABSTRACT

An improved method of making a solar energy collector is disclosed. The method involves fusing a collector panel to headers using a high frequency magnetic field. End fitments are also fused to the headers. Other improvements in solar energy collectors per se are also disclosed.

7 Claims, 20 Drawing Figures

SOLAR ENERGY COLLECTORS

This invention relates generally to solar energy collectors. In particular, the invention is concerned with a method of manufacturing a solar energy collector and with improvements in collectors per se.

The invention has been devised primarily in connection with solar energy collectors for swimming pool heating systems, although the invention is not limited to this particular application. A typical solar energy collector for a swimming pool heating system comprises a generally rectangular panel having water flow passages extending longitudinally thereof, and two headers sealed to respectively opposite ends of the panel. The panel and headers may be plastic extrusions.

All solar energy collectors by their very nature are exposed to severe operating conditions in use, due not only to the effects of solar radiation, but also to extremes of climate. Plastic materials used in solar energy collectors must accordingly be carefully selected for durability and must be specially stabilized against the effects of ultraviolet radiation. This need for special materials in turn brings with it the problem of sealing together the components which make up the collector, and in particular forming a durable and leak-free seal between the collector panel and the headers. Typically, a collector should be designed to operate effectively without leakage for a minimum period of at least five years. Attempts to employ conventional adhesives for sealing headers to a panel have generally not been successful by themselves. In some cases, mechanical fasteners have additionally been required for effective sealing.

Heat sealing techniques have also been employed as shown, for example, in U.S. Pat. No. 3,934,323, Ford et al. In that case, a heated die is applied to the ends of the panel to in effect spread the ends, and the panel and headers are then heated and pressed together to form a heat seal.

An object of the present invention is to provide a method of making a solar energy collector which is improved in terms of the sealing effect between the panel and headers. A further aim of the invention is to provide improvements in solar energy collectors per se.

The method of the invention includes the steps of forming a generally rectangular panel in a thermoplastic material, the panel having a plurality of fluid flow passageways extending longitudinally thereof, and forming a pair of elongate headers in a thermoplastic material. Each header is of a length at least equal to the transverse dimension of the panel and includes a main fluid flow passageway extending longitudinally of the header, and an elongate slot which also extends longitudinally of the header and which communicates with the fluid flow passageway. The slot is dimensioned to closely receive an end portion of the panel and has inner faces arranged for co-operation with opposed faces of said panel end portion. The method also includes the step of providing on one of each of said opposed inner faces of the header slot and panel, a sealing strip which extends over at least substantially the entire length of the relevant face and which comprises a thermoplastic material capable of fusing with the material of said headers and panel and having magnetically excitible particles dispersed therein. The panel and headers are then assembled with said end portions of the panel received in the slots in the headers. Next, the sealing strips are subjected to the effect of a high frequency magnetic field having characteristics chosen to excite said particles in the sealing strips to an extent sufficient to cause the strips to fuse with said opposed faces on the panel and headers. Suitable end fitments are then attached to the ends of the headers to complete the collector.

Other aspects of the invention provide improvements in solar collectors per se.

In order that the invention may be more clearly understood, reference will now be made to the accompanying drawings which illustrate a number of preferred embodiments of the invention.

Figure 1:
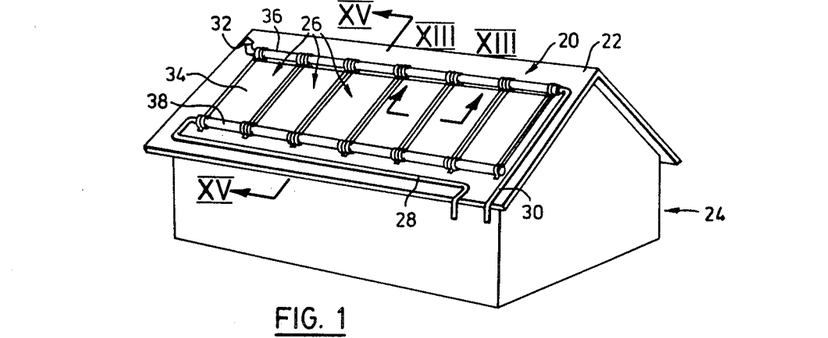
FIG. 1 is a perspective view showing an array of solar collectors installed on the roof of a building, for example, as part of a swimming pool heating system.

Referring first to FIG. 1, an array of solar energy collectors is generally indicated at 20 on the roof 22 of a building 24. In this particular embodiment, six collectors 26 are used and are coupled together side by side as will be more particularly described later. Flow and return lines for coupling the collectors to the remaining components of a swimming pool heating system are indicated at 28 and 30 respectively. A vacuum breaker is indicated at 32.

Referring to the collector which appears at the left hand side of the array in FIG. 1 by way of example, each collector includes a generally rectangular panel 34, and a pair of elongate headers 36 and 38 coupled to respectively opposite end portions of the panel. Panel 34 has a plurality of longitudinally extending fluid flow passageways (not shown in FIG. 1) which extend between the headers and through which water flows between the headers when the heating system is in use.

Figures 2, 2A, 2B:
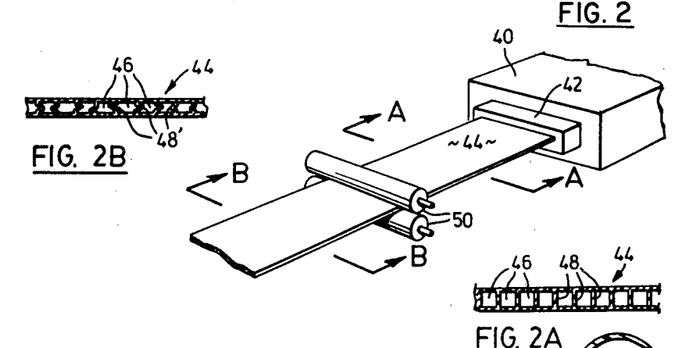
FIG. 2 is a diagrammatic illustration of the manufacture of the panel used in the collectors of FIG. 1.
FIGS. 2A and 2B are cross-sectional views on lines A—A and B—B of FIG. 2 respectively.

FIG. 2 illustrates the formation of panel 34. The panel is formed by a section severed transversely from a continuous thermoplastic extrusion. In this particular embodiment, the plastic material is a co-polymer of polypropylene and polyethelene having normal additives and ultraviolet stabilizers. Part of a conventional extruder is indicated at 40 in FIG. 2 and has an extrusion head 42 from which issues a continuous extrudate 44. The extrudate is in the form of a relative thin and flat sheet having a plurality of generally rectangular passageways extending longitudinally thereof.

FIG. 2A shows the cross-sectional shape of the extrudate immediately downstream from the head 42. The passageways are denoted 46 and are separated by walls 48 which extend generally normal to the top and bottom surfaces of the sheet. Sheet 44 is severed transversely at appropriate positions to provide a required length for forming the panels (as panel 34) of solar collectors. The extrudate could be severed substantially in the form in which it leaves the extrusion head (after hardening and cooling) in which case the fluid flow passageways of the solar collector panels would be generally of the form shown in FIG. 2A. However, for reasons which will be explained later, it is preferred to cause the walls 48 between the fluid flow passageways to assume a buckled or zig-zag configuration in the final panel. This is achieved by passing the extruded sheet through the nip between a pair of rolls 50 (FIG. 2) arranged to slightly reduce the overall thickness of the sheet. This causes the walls 48 to buckle and assume generally the configuration indicated at 48' in FIG. 2B. Rolls 50 are positioned at a distance from the extrusion head such that the extrudate will not have fully cooled and hardened before it reaches the rolls, so that the extrudate will set in its final form with the walls 48 buckled. It will of course be appreciated that the buckling action will take place in random fashion and that the walls will not necessarily assume the particular shapes shown in FIG. 2B.

The buckled wall configuration has two primary advantages in the finished collector. Firstly, it provides for freeze protection in the event that the collector is inadvertently exposed to freezing temperatures without having first been drained of water. The buckled internal walls in the panel of the collector allow the panel to expand in thickness as the water freezes without bursting the panel. Secondly, the buckled walls promote turbulence in the fluid (usually water) flowing through the passageways 46 and thereby promote improved heat transfer between the fluid and ambient air.

As indicated above, it is not essential (although preferred) that the internal walls in the panel be buckled. In any event, it will be appreciated that the extruded sheet 44 can be severed transversely into appropriate lengths for forming successive panels for use in assemblying solar collectors on a continuous basis.

Figures 3, 4:
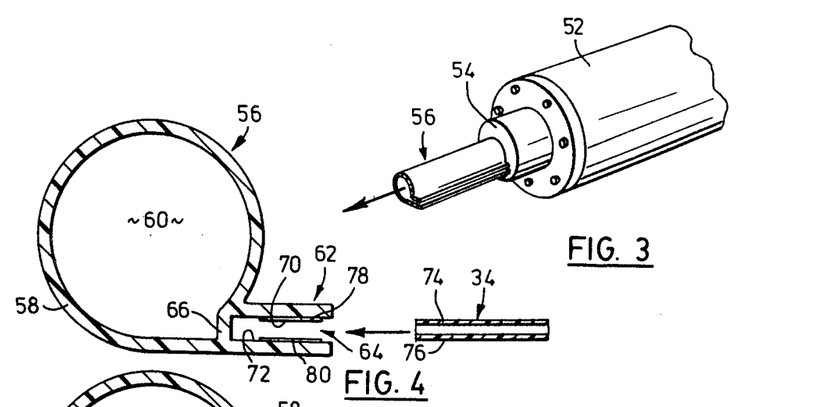
FIG. 3 is a diagrammatic illustration of the manufacture of the headers used in the collectors of FIG. 1.
FIG. 4 is a transverse sectional view of the header shown in manufacture in FIG. 3.

Reference will now be made to FIGS. 3-6 of the drawings in describing the formation of the headers (as headers 36 and 38-FIG. 1). The headers are also in the form of extrusions and FIG. 3 shows a conventional extruder 52 having an extrusion head 54 for producing an extrudate 56. FIG. 4 shows the cross-sectional shape of the extrudate 56. The extrudate is formed continuously and is severed into lengths appropriate to the required header length. In this particular embodiment the headers are of substantially the same transverse dimension as the panel of the collector although in other cases it may be necessary to make the headers longer.

Figure 5:
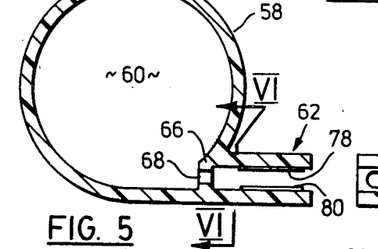
FIG. 5 shows the header of FIG. 4 after a subsequent step in the manufacturing operation.
Figure 6:
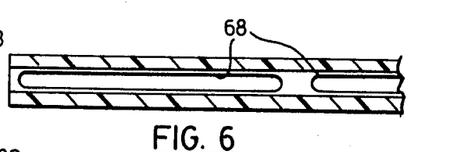
FIG. 6 is a sectional view on line VI—VI of FIG. 5.

As seen in FIG. 4, the extrudate includes a main generally cylindrical portion 58 defining a main fluid flow passageway 60 which extends longitudinally of the header. An integral channel shaped portion 62 projects outwardly from cylindrical portion 58 and defines a narrow slot 64 disposed generally tangentially with respect to the cylindrical portion 58. At the inner end of slot 64 is an upright wall 66 which closes the bottom of the slot in the as-moulded configuration of the extrudate. Slot 64 is dimensioned to closely receive an end portion of the panel of the collector. In assembling the collector, the panel is inserted into slot 64 until it reaches wall 66 so that the wall in effect defines the fully inserted position of the panel. However, before the panel is inserted, wall 66 is formed with apertures for providing fluid communication between the longitudinal passageways in the panel and the main fluid flow passageway 60 of the header. As shown by FIGS. 5 and 6, these apertures take the form of elongate slots 68 formed right through wall 66. The slots may be formed using a conventional routing tool. The form and arrangement of the apertures in wall 66 are believed to be non-critical except that the total cross-sectional area of all of the apertures should approximately equal the total cross-sectional area of all of the fluid flow passageways in the panel. At the same time, it is believed that a series of apertures is to be preferred over a continuous opening for the reason that the portions of the wall which remain between the apertures impart additional strength to the header. In one particular embodiment, five of the slots 68 were provided in a two foot length header.

Referring back to FIG. 4, slot 64 has inner faces 70 and 72 which co-operate with opposed faces 74 and 76 at the end portion of the panel when the panel is inserted in slot 64. Integral sealing strips 78 and 80 are formed on the faces 70 and 72 respectively of slot 64. These sealing strips are co-extruded with the main extrudate 56. The strips are of the same material as the main extrudate except that they have magnetically excitable particles dispersed therein.

In this particular embodiment, the main header extrudate 56 is made of the same material as the extrudate 44 for forming the panel of the collector (a copolymer of polypropylene and polyethelene with appropriate stabilizers). The strips 78 and 80 are made of the same copolymer with iron particles dispersed therein.

Figure 7:
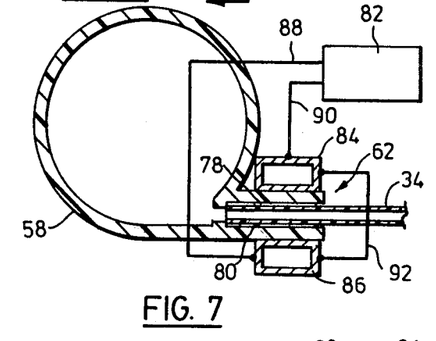
FIG. 7 is a view similar to FIG. 5 but showing the panel assembled to the header preparatory to fusing of the panel in place.

Reference will now be made to FIG. 7 which shows the header of FIGS. 4 and 5 and a panel assembled together. By way of example, it will be assumed that the header and panel are those denoted 36 and 34 respectively in FIG. 1. It will be seen that panel 34 is inserted in to the slot 64 in the header until it abuts the remainder of wall 66. The sealing strips 78 and 80 inside the slot overlie the faces 74 and 76 at the end portion of the panel within the slot. Having assembled the header and panel in this way, the sealing strips 78 and 80 are subjected to the effect of a high frequency magnetic field having characteristics selected to excite the particles in the sealing strips to an extent sufficient to cause the strips to fuse with the panel and header in the areas of the opposed faces. As shown in FIG. 7, the magnetic field is applied using a conventional radio frequency generator of the type used for induction welding. The generator is indicated generally by reference numeral 82 and includes an induction coil (not shown) in which a radio frequency magnetic field is induced. The magnetic field is applied to the sealing strips by way of two transmission heads 84 and 86 applied to opposite sides of the channel shaped portion 62 of the header extrusion. The heads are in the form of rectangular section copper tubes which are hollow and through which cooling water is passed. The tubes are coupled to the generator 82 by leads 88 and 90 and to one another by a lead 92. The tubes and header will be supported in an appropriate jig during this operation and appropriate ancillary equipment will be provided for circulating water through the tubes. However, since this equipment forms no part of the present invention, it has not been illustrated.

Figure 8:
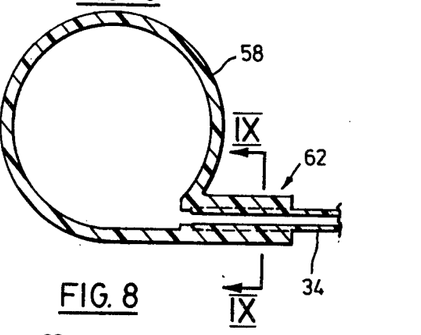
FIG. 8 is a view similar to FIG. 7 showing the panel fused to the header.

The magnetic field produced by generator 82 is applied to the sealing strips 78 and 80 at a frequency and intensity and for a period of time sufficient to effect the required fusion of the panel to the header. In practice, it is found that the sealing strips tend to melt and flow inwardly and outwardly of slot 64 and to essentially merge into the opposed faces of the panel and header. In one particular example, a frequency of 7,000 c.p.s. was found to be adequate. In any event, after a suitable period of time (as determined by experimentation) the generator 82 is switched off. However, the tubes 84 and 86 are allowed to remain in contact with the header until the assembly has cooled to an extent sufficient to permit it to be handled. FIG. 8 shows the panel and header fused together at this time. The portion of the panel inside the header slot has been shown in effect "merged" into the portion 62 of the header as in fact occurs in practice.

Figure 9:
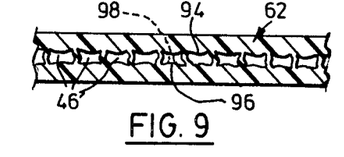
FIG. 9 is a sectional view on line IX—IX of FIG. 8.

FIG. 9 is a sectional view through the merged portion of the panel and header and shows the configuration of the fluid flow passageways (denoted 46') in this area. It will be seen that the upper and lower walls of each passageway have distorted inwardly to a slight extent as indicated at 94 and 96 to form protrusions or "bumps" which partially restrict the passageway. These protrusions have been found to occur naturally as a result of the fusing operation described previously. In practice, they have been found to have the advantage of acting as a control on the flow of fluid through the passageway. Also, they serve to improve the rigidity of the header. It has further been found that it is possible to control the size of the protrusions 94 and 96 by appropriately controlling the duration for which the magnetic field is applied to the sealing strips 78 and 80. Thus, by extending the duration compared with that which was used to form the configuration shown in FIG. 9, it is possible to cause the opposing protrusions to merge and define what is essentially an hourglass shape as indicated by dotted lines at 98 in FIG. 9. This provides for a further restriction in the flow of fluid through the passageway, which may be required in some circumstances. It will of course be appreciated that the same effect will occur in all of the passageways of a particular header.

It will also be appreciated that while the preceding description refers specifically to the fusing of the panel to the header 36, a similar operation will be performed to fuse the other end of the panel to the other header (38). The fusing operations used in each case need not be the same. For example, it might be desirable to provide different fluid flow control conditions in one header compared with the other. After the panel and headers have been fused together, end fitments are attached to the ends of the headers by what is basically a very similar fusing operation. That operation will now be described more particularly with reference to FIGS. 10, 11 and 12.

Figure 10:
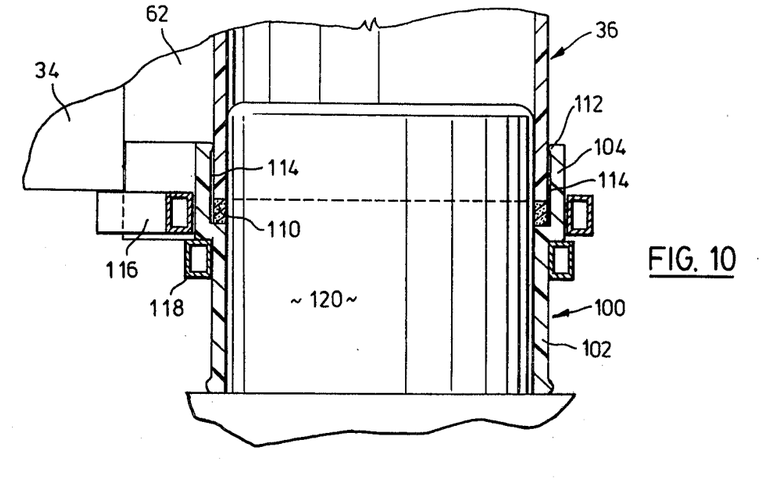
FIG. 10 is a longitudinal sectional view through an end portion of the header of FIG. 8 showing an end fitment in place on the header preparatory to fusing of the header and fitment.
Figure 11:
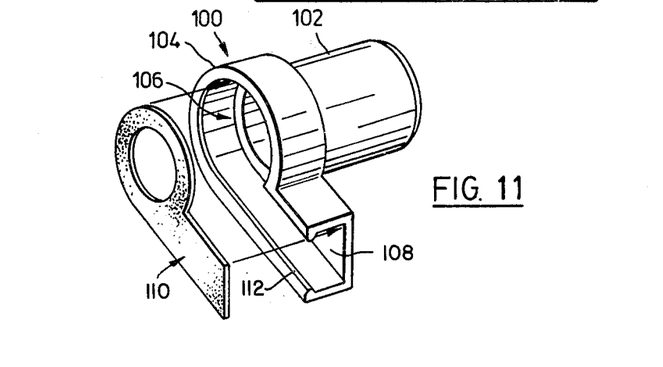
FIG. 11 is an exploded perspective view showing the end fitment of FIG. 10 and an associated gasket used inside the fitment.

FIG. 10 shows an end portion of one of the headers in longitudinal section. For convenience it will be assumed that header 36 has been shown and that the other header will be the same. Part of the panel 34 bonded to the header is also visible as is part of the U-shaped portion 62 of the header. An end fitment to be fused to the header is indicated generally at 100 and is shown in perspective in FIG. 11. Similar fitments are also shown after the fusing operation at the ends of adjacent solar collectors in FIG. 14. Referring primarily to FIG. 11, the fitment includes an outer portion 102 of cylindrical shape and an inner portion 104 having an inner surface 106 shaped to conform with the external profile of header 36 and having an open outer end at 108. The fitment is a one piece moulding in the same plastic material as the panel and headers. As can be seen from FIG. 10, the fitment is placed over the end of the header so as to fit snugly around its external shape and with the outer end portion 102 projecting outwardly from the header generally coaxially therewith. The presence of this cylindrical portion permits the collector to be readily coupled to other similar collectors or to the other components in a solar heating system.

FIG. 11 also shows a gasket 110 which is shaped to fit inside the inner end portion 104 of fitment 100. Gasket 110 is of the same form as the sealing strips 78 and 80 used for fusing the panel to the headers. Thus, the gasket is made of the same copolymer as the fitment but has magnetically excitable particles dispersed therein. The gasket is placed inside the fitment before the fitment is applied to the end of the header, and the gasket is visible at 110 in FIG. 10.

By carefully examining FIG. 10, it will be seen that the inner surface 106 of end portion 104 of fitment 100 is relieved inwardly of an outer rib 112 to provide a relief space 114 around the outer end portion of header. Part of rib 112 is also visible in FIG. 11. This space is provided to allow the gasket 110 to flow into the space between the end portion of the header and the fitment as the gasket melts, for improving fusing of the fitment to the header.

Having assembled the fitment to the header in the manner shown in FIG. 10, gasket 110 is subjected to the effect of a high frequency magnetic field in much the same fashion as the sealing strips were subjected to the magnetic field in the embodiment of FIG. 7. As in that case, a radio frequency generator is employed to produce the magnetic field and is applied to the components to be fused by way of water cooled "heads" in the form of copper tubes. The two heads used in the case of the end fitments are indicated at 116 and 118 in FIG. 10 and will be coupled to the generator (not shown) as in the embodiment of FIG. 7. Tube 118 is shaped to define a circular configuration in which it extends completely around the end portion 102 of the end fitment, while tube 116 is shaped to conform with the external shape of the end portion 104 of the fitment. Each tube will be made in two sections hinged together to permit it to be fitted to and removed from the fitment.

As in the case of FIG. 7, the tubes or "heads" and the components to be fused will be mounted in a suitable jig while a high frequency magnetic field is applied to the gasket causing it to melt and fuse into the header and fitment generally in the same manner as described above. In this case, a mandrel 120 is also used inside the fitment to prevent the gasket flowing into the interior of the fitment and/or header.

Figure 12:
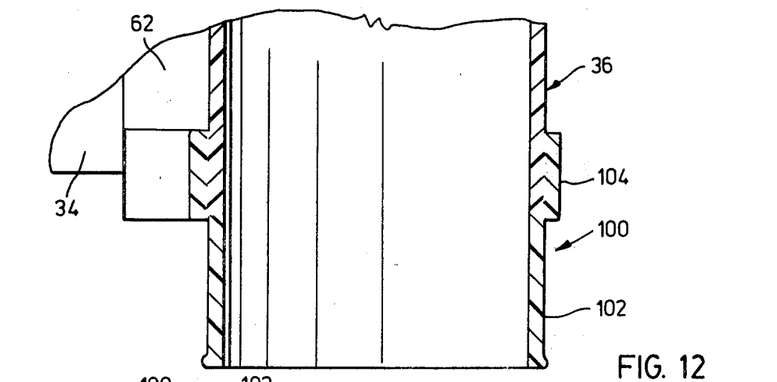
FIG. 12 is a view similar to FIG. 10 showing the end fitment and header fused together.

FIG. 12 shows the end product of the fusing operation. It will be seen that the header and fitment have fused together and become essentially one unit.

It will be appreciated from the foregoing description that the solar collector produced by the method described will essentially become a one piece integral assembly and it is thought that the risk of leakage will practically have been eliminated. In the particular embodiment described, the components of the collector were referred to as being made of the same copolymer. It will of course be appreciated that other thermoplastic materials may be used. Further, it should be noted that the components to be fused together need not essentially be of the same material so long as the sealing strips or gaskets employed are of a material capable of fusing with the materials of the components. For example, where two components to be fused are of two different materials, the sealing strip or gasket used between those components could be a copolymer of the materials of the components.

It should also be noted that the end fitments for the headers of the solar collector need not essentially be attached by a fusing operation. In some instances it might, for example, be convenient to use solvents or adhesives or other expedients for attaching the fitments.

Figures 13, 14, 14A:
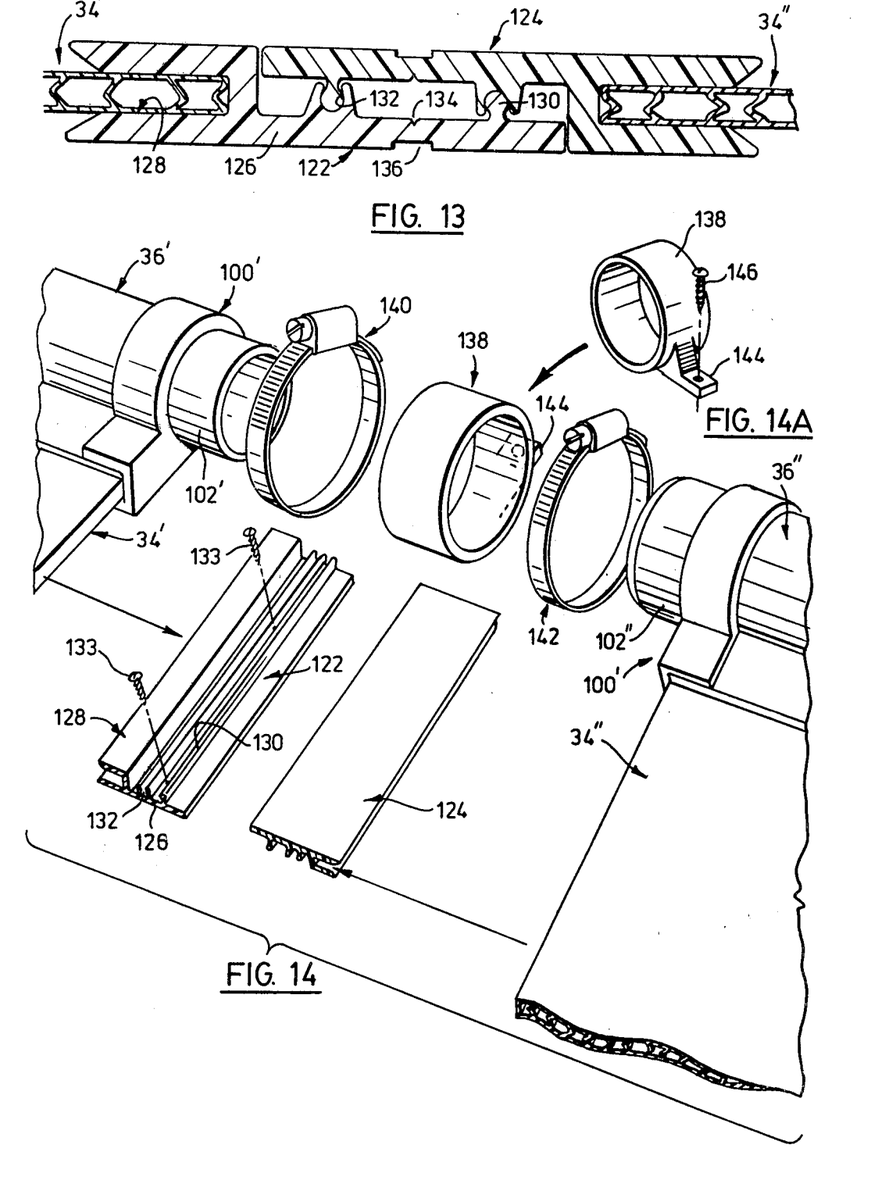
FIG. 13 is a cross-sectional view generally on line XIII—XIII of FIG. 1 and shows strip connectors used to couple adjacent solar collectors in the array.
FIG. 14 is an exploded perspective view corresponding to FIG. 13 and showing additional components used for coupling the headers of adjacent collectors.
FIG. 14A is a detailed perspective view of part of FIG. 14.

Reference will now be made to FIGS. 13 and 14 in describing further features of applicant's solar collector. FIG. 13 shows connector strips used between adjacent collectors in an array such as that shown in FIG. 1. The strips are designed to connect the panels of adjacent collectors so that the array presents a generally flat external surface, and also to hold down the panels onto their support surface so as to minimize the risk of lifting of the panels under severe wind conditions.

In FIG. 13, the panels of two adjacent collectors are indicated as 34' and 34". Two similar connector strips 122 and 124 are provided between the panels. The strips are shown in perspective in FIG. 14. Referring to strip 122 as typical of both strips, it will be seen that the strip includes a generally flat base portion 126 which lies flat on a support surface (in the case of strip 122). Strip 124 is identical but shown inverted so that its base portion is in fact uppermost in use. In any event, strip 122 is shaped to define on one side, a continuous laterally directed channel 128 dimensioned to frictionally receive an edge portion of the collector panel 34'. Adjacent the opposite side of the strip, a rib 130 of substantially circular shape in cross-section protrudes upwardly from the base portion and extends longitudinally thereof parallel to its outer edge. Inwardly of rib 130 a channel 132 of generally complimentary shape extends parallel to rib 130. The rib 130 and channel 132 are designed so that when two similar strips (as strips 122 and 124) are inverted with respect to one another they can be snap fitted together with the rib on one strip snapped into the channel on the other as shown in FIG. 13. The assembly of the two strips will then define two laterally directed channels for engaging opposed edges of adjacent collector panels.

The lowermost strip in an assembly is secured to a support surface by fasteners such as the screws indicated at 133 in FIG. 14. Referring back to FIG. 13, a shallow notch 134 extends longitudinally of the strip, between the rib 130 and the channel 132 and acts as a guide for locating the screws. Openings could be provided in the strip for receiving the screws but generally this is not necessary. Immediately below the groove is a shallow channel 136 capable of receiving caulking compound or other sealant. A strip of sealant will be introduced into the channel before the screws are introduced and the strip will be placed on a roof or other support surface and screws driven through at appropriate locations. The sealant will then prevent leakage at the position of any screw irrespective of its location. When a particular strip has been installed in this way, its companion strip can then be engaged with the associated panel and snap fitted to the already installed strip as discussed above. The strips themselves will preferably be of a length equal to the exposed length of each panel between the associated headers. Of course, shorter lengths of connector strip may be appropriate in some situations. The intention is that the connector strip will be extruded in continuous lengths which can be cut to size as required.

FIG. 14 shows the adjacent panels 34' and 34" in perspective and also shows portions of their top headers, denoted 36' and 36" to which end fitments 100' and 100" have been attached. The fitments have respective cylindrical inner end portions 102' and 102" disposed substantially in alignment with one another. The collectors are shown in exploded positions in FIG. 14 and will, as installed, be substantially closer together so that the portions 102' and 102" will be substantially in abutment. A coupling sleeve 138 is fitted over the portions 102' and 102" as the collectors are brought together. Conventional gear clamps 140 and 142 are then tightened around the coupling sleeve 138 to clamp the sleeve to the end fitments 100' and 100" and provide an effective liquid tight seal between the adjacent headers. Sleeve 138 has an integral tab 144 which projects generally tangentially from the sleeve itself and which has an aperture for receiving a screw 146 (FIG. 14A) for securing the sleeve to the roof or other support surface. The sleeve and integral tab are made of the material known as EPDM. This is a flexible and resilient material and has the advantage that tab 144 can stretch and contract to accommodate expansion and contraction of the panel due to changes in temperature. Although not essential, it is preferable that the solar collectors be installed on a hot day so that each collector will be substantially in its fully expanded position as installed. The tabs 144 can then stretch to accommodate contraction on the colder days. Coupling sleeves similar to sleeve 138 will be provided between adjacent collectors and at the outer ends of the end-most collectors in an array and at both the top and bottom headers. The use of these coupling sleeves in conjunction with the connector strips 122 and 124 will assure that the collectors are all firmly held down to the roof or other support surface so that the risk of shifting of lifting of the panels is minimized.

Figures 15, 16:
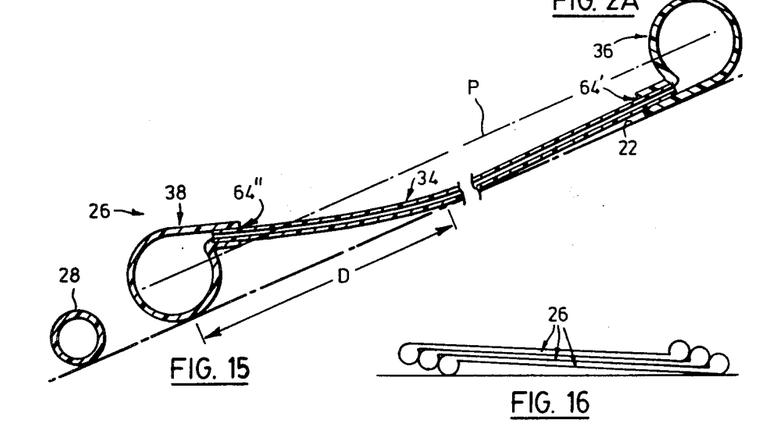
FIG. 15 is a longitudinal sectional view through one of the collectors shown in FIG. 1 and is taken generally along line XV—XV.
FIG. 16 is a diagrammatic illustration showing a number of the collectors nested together for transportation.

FIG. 15 is a longitudinal sectional view through one of the collectors in the array denoted 20 in FIG. 1. It will be seen that the headers 36 and 38 are arranged with their slots or mouths (denoted 64' and 64" respectively) disposed on opposite sides of a plane P joining the axes of the main fluid flow passageways of the headers. In other words, the bottom header 38 is inverted compared with the position it would be expected to adopt if the panel were to lie flat on the roof surface. This inversion has two primary advantages. Firstly, it permits several solar collectors to be "nested" together on top of one another so as to occupy minimum space for transportation and/or storage as shown in FIG. 16. Secondly, in the event that "weathering" of the collector is noticed on one side, the collector can be reversed and inverted so that the side of the collector which was formerly exposed is now against the roof surface. This effectively doubles the life of the collector.

The panel 34 of the collector is extremely flexible and can readily be deformed to accommodate this reversed header configuration during installation. In practice, it has been found that the distance D between the lower header and the point of first contact of the panel with the roof surface will be as little as one foot. It has also been found that, due to its resilient nature, the panel will readily change its shape as required when the collector is reversed and inverted.

At this stage it should be noted that, although the reversed header arrangement has been described in connection with the features of the invention discussed above, it is not essential that the reverse header arrangement be used with the other features. Also, the fusing process described can of course be used with any appropriate header orientation.

Figure 17:
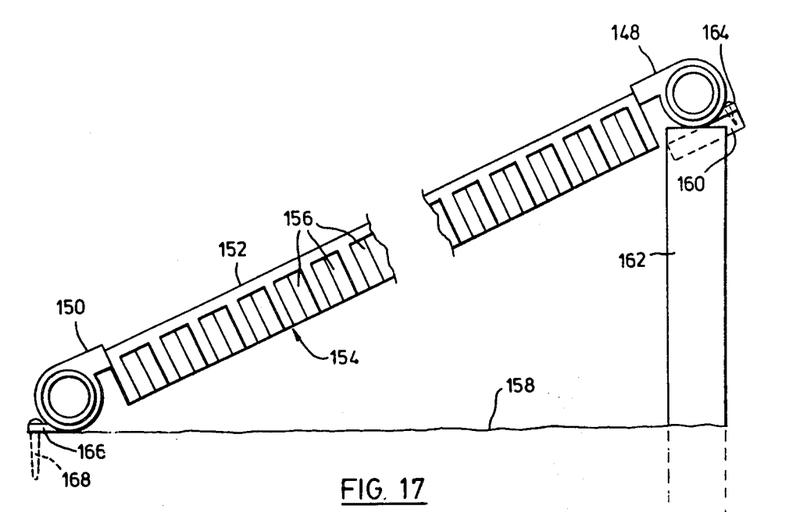
FIG. 17 is a side elevation of a solar collector according to a further embodiment of the invention; and, FIG. 18 is an underneath elevational view of part of the collector of FIG. 17.
Figure 18:
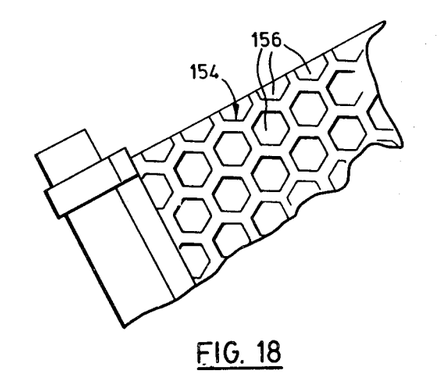

FIGS. 17 and 18 illustrate a further embodiment which, again, is applicable both to solar collectors of any of the forms disclosed herein and to other forms of collectors comprising two headers with a panel extending therebetween. Conventionally, solar collectors must be mounted on a substantial support including a relatively large and flat surface such as the roof of a building (FIG. 1). In other cases, a specially constructed rack must be provided for supporting the solar collectors. The embodiment illustrated in FIGS. 17 and 18 is intended to avoid the need for such a structure. In FIG. 17, a solar collector is shown in side view and includes an upper header 148, a lower header 150 and a panel 152. In this case, the headers and the panel are of the form described above although this is not essential. Each header has a generally tangentially extending slot or mouth which receives the panel so that the panel is offset but parallel to a plane containing the axes of the main flow passageways in the headers.

According to this aspect of the invention, a honeycomb structure made of cardboard is applied to the under surface of panel 152 and the "cells" of the honeycomb are filled with a rigid polyurethane foam. The cardboard honeycomb structure is generally indicated 154 and defines cells 156 disposed with their axes normal to panel 152. Thus, the cells extend outwardly away from the panels. The foam bonds to the panel and has the effect of imparting substantial rigidity to the collector so that the collector in itself becomes a rigid unit which is self-supporting. This in turn eliminates the need for extensive supporting structure for an array of panels. As seen in FIG. 17, the collector is shown supported in an inclined position above the ground surface (indicated at 158). The upper collector is supported by an inclined wooden beam 160 (e.g. of 2"×8" size) nailed between two vertical support posts, one of which is indicated at 162 (e.g. of 4"×4" size) set in the ground. Header 148 is attached to beam 160 by a nail 164 driven through an integral tab which projects outwardly from the header in the manner of tab 144 on the coupling sleeve shown in FIG. 14. A similar tab 166 on the lower header is secured by a stake 168 into the ground. It will be appreciated that other similarly rigid collectors may be coupled side by side with the collector shown in FIG. 17 and supported on the same beam 160.

The polyurethane foam backing on the panel will be applied by inverting the collector before installation, placing the honeycomb on the inverted panel and spraying liquid polyurethane into the honeycomb cells. If necessary, the surface of the panel can be treated by conventional corona spark discharge techniques to improve the adhesion of the polyurethane foam. These techniques will be essentially the same as the techniques employed for treating plastic materials prior to silkscreen printing and will not therefore be described in detail.

The cardboard honeycomb 154 referred to may of course be replaced by equivalent structure. It is not essential that the structure should be of cardboard or that the cells in the structure be honeycomb shape. The structure should merely provide a matrix for receiving polyurethane foam and providing a reasonable depth backing on the panel. Cardboard is a particularly convenient material because of its relative low cost but in other cases it may be possible to use, say, plastic mouldings or grids for receiving the polyurethane foam.

It will of course be appreciated that the preceding description relates to specific embodiments of the invention and that many modifications are possible within the broad scope of the invention. It is also to be understood that the various aspects of the invention disclosed herein need not necessarily by used together as described but may find application even in association with other forms of solar collectors.

Referring in particular to the embodiment best illustrated in FIGS. 3 to 8, it is to be noted that the sealing strips 78 and 80 need not be co-extruded with the headers. In other embodiments the strips could be formed on the panel or made as separate strips subsequently secured to or placed between the surfaces to be fused.

I claim:

1. A method of making a solar energy collector comprising the steps of:
    forming a generally rectangular panel of a thermoplastic material, the panel having a plurality of fluid flow passageways extending longitudinally thereof;
    forming a pair of elongate headers of a thermoplastic material, each header being of a length at least equal to the transverse dimension of the panel and including a main fluid flow passageway extending longitudinally of the header, and an elongate slot which also extends longitudinally of the header and which communicates with said fluid flow passageway, the slot being dimensioned to closely receive an end portion of the panel and having inner faces arranged for co-operation with opposed faces of said panel end portion;
    providing on one of each of said opposed inner faces of the header slot and the panel a sealing strip which extends over at least substantially the entire length of the relevant face and which comprises a thermoplastic material capable of fusing with the material of said headers and panel, and having magnetically excitible particles dispersed therein;
    assembling said panel and headers with said portions of the panel received in the slots in the headers;

subjecting said sealing strips to the effect of a high frequency magnetic field having characteristics selected to excite said particles in the sealing strips to an extent sufficient to cause said strips to fuse with said opposed faces on the panel and headers; and attaching suitable end fitments to the ends of each header.

2. A method as claimed in claim 1 wherein said step of forming said collector panel comprises forming a continuous extrusion having top and bottom walls and a plurality of upright walls extending between said top and bottom walls and defining said fluid flow passageways; continuously reducing the thickness of the extrusion before said thermoplastic material has set so as to cause said upright walls to buckle; and subsequently cutting said extrusion transversely at positions spaced therealong corresponding to the required panel length.

3. A method as claimed in claim 1, wherein said step of forming a pair of elongate headers comprises forming a continuous extrusion of said thermoplastic material of a cross-sectional shape providing a main fluid flow passageway and an elongate slot extending longitudinally of the header; and transversely severing said extrusion into lengths corresponding to the required lengths of said headers; and wherein said step of providing sealing strips is performed by co-extruding said strips on faces of said extrusion to form said inner faces of the header slots.

4. A method as claimed in claim 3, wherein said extrusion as formed includes a continuous imperforate wall at the inner end of said slot, and wherein said step of forming the headers further comprises the step of forming apertures in said wall to provide for fluid communication between said main fluid flow passageway of each header and the associated slot.

5. A method as claimed in claim 1, wherein said step of attaching suitable end fitments to the ends of each header comprises moulding fitments each shaped to fit over and enclose an end portion of one of said headers, each fitment including a cylindrical outer end portion disposed generally co-axial with said main fluid flow passageway of the header when the fitment is in place; forming a gasket shaped to fit into said end fitment adjacent said end of the header, said gasket being made of a thermoplastic material capable of fusing with the material of said headers and fitment and having magnetically excitible particles dispersed therein; assembling said fitment to said header with the interposition of said gasket; and subjecting said gasket to the effect of a high frequency magnetic field having characteristics selected to excite said particles in the gasket to an extend sufficient to cause said gasket to fuse with the fitment and header.

6. A method as claimed in claim 5, wherein said panel, headers, end fitments, sealing strips, and gasket are all made of the same thermoplastic material.

7. A method as claimed in claim 1, comprising the further step of controlling the effect of said high frequency magnetic field to cause partial melting of the thermoplastic material of the panel by conduction of heat from said sealing strips and consequent formation of integral protrusions extending into said fluid flow passageways and partially obstructing the same for controlling fluid flow conditions therein.

* * * * *